(12) United States Patent
Omatsu et al.

(10) Patent No.: US 8,123,845 B2
(45) Date of Patent: Feb. 28, 2012

(54) WATER BASE DUAL COLOR INK COMPOSITION AND WRITING UTENSIL USING THE SAME

(75) Inventors: Takeshi Omatsu, Kyoutanabe (JP); Tomochika Yoshitsugi, Ibaraki (JP)

(73) Assignee: Sakura Color Products Corporation, Osaka (JP)

( * ) Notice: Subject to any disclaimer, the term of this patent is extended or adjusted under 35 U.S.C. 154(b) by 151 days.

(21) Appl. No.: 12/308,247

(22) PCT Filed: Jun. 11, 2007

(86) PCT No.: PCT/JP2007/061719
§ 371 (c)(1),
(2), (4) Date: Dec. 11, 2008

(87) PCT Pub. No.: WO2007/145163
PCT Pub. Date: Dec. 21, 2007

(65) Prior Publication Data
US 2010/0162921 A1    Jul. 1, 2010

(30) Foreign Application Priority Data

Jun. 12, 2006 (JP) .................................. 2006-162447
Jul. 26, 2006 (JP) .................................. 2006-203757

(51) Int. Cl.
*C09D 11/16* (2006.01)
*C09D 11/18* (2006.01)

(52) U.S. Cl. ................. 106/31.28; 106/31.58; 106/31.86

(58) Field of Classification Search ............... 106/31.28, 106/31.58, 31.86
See application file for complete search history.

(56) References Cited

U.S. PATENT DOCUMENTS 6,258,873 B1 * 7/2001 Gundlach et al. ............. 523/160
(Continued)

FOREIGN PATENT DOCUMENTS

EP    1095991 A1 *  5/2001
(Continued)

OTHER PUBLICATIONS

English Machine translation of JP2007-031558.*
(Continued)

*Primary Examiner* — Jerry Lorengo
*Assistant Examiner* — Veronica F Faison
(74) *Attorney, Agent, or Firm* — Wenderoth, Lind & Ponack, L.L.P.

(57) ABSTRACT

The invention provides a dual color ink composition which comprises:
(a) at least one pigment selected from a pearlescent pigment and a metal powder pigment;
(b) water;
(c) at least one water-soluble organic solvent selected from alcohols, glycols and glycol ethers, any of which have a branched hydrophobic group;
(d) a water-soluble dye; and
(e) a modified starch as a water-soluble fixing agent.

32 Claims, No Drawings

U.S. PATENT DOCUMENTS

| | | | |
|---|---|---|---|
| 6,422,776 B1* | 7/2002 | Nakatani | 401/216 |
| 6,616,741 B1* | 9/2003 | Sawa et al. | 106/31.68 |
| 6,706,101 B1* | 3/2004 | Yoshimura et al. | 106/31.28 |
| 6,706,103 B2* | 3/2004 | Yoshimura et al. | 106/31.6 |
| 2001/0051217 A1* | 12/2001 | Nigam | 427/256 |

FOREIGN PATENT DOCUMENTS

| | | |
|---|---|---|
| JP | 08-151547 | 6/1996 |
| JP | 10-245517 | 9/1998 |
| JP | 11-130998 | 5/1999 |
| JP | 2000-129188 | 5/2000 |
| JP | 2004-137427 | 5/2004 |
| JP | 2007-031558 | 2/2007 |

OTHER PUBLICATIONS

English Machine translation of JP10-245517.*
English Machine translation of JP2000-129188.*
English Machine translation of JP11-130998.*

* cited by examiner

WATER BASE DUAL COLOR INK COMPOSITION AND WRITING UTENSIL USING THE SAME

TECHNICAL FIELD

The present invention relates to a water base dual color ink composition capable of providing a dual color writing having a metalescent and/or pearlescent inner portion and outer contour portions therearound, that is, a writing with border or fringe, when the writing is provided on a permeable porous substrate like paper. The invention further relates to an ink composition for a writing utensil, in particular, a water base ballpoint pen ink composition which contains the water base dual color ink composition, as well as a writing utensil, in particular, a water base ballpoint pen which contains the water base dual color ink composition.

BACKGROUND ART

A conventional water base dual color ink composition contains a metal powder pigment such as aluminum powder, a water-soluble dye, water, and a penetrating organic solvent (see patent literatures 1 to 3). When a writing is provided using the above-mentioned ink composition on a porous substrate such as paper into which the penetrating organic solvent penetrates or which can absorb the solvent, the metal powder pigment is immediately trapped in situ on the substrate with which the pigment has come into contact to form a metalescent inner portion as written, and the dye penetrates and diffuses into the substrate around the inner portion together with the penetrating organic solvent, and it exudes from the inner portion to form outer contour portions around the inner portion, thereby forming a dual color writing, that is, a writing with border or fringe. Such a dual color ink composition may be used as an ink composition for marking pens, felt pens, water base ballpoint pens, and the like.

However, as the first disadvantage of the conventional water base dual color ink compositions, the following is noted. In order to improve the fixability of writing, a carboxymethyl cellulose sodium salt or a water-soluble resin such as polyvinyl alcohol is used as a fixing agent (see patent literatures 1 and 2). However, when a little larger amount of the fixing agent is used to make the viscosity of the resulting water base dual color ink composition relatively higher so that it can be used as, for example, an ink composition for a water base ballpoint pen, the fixing agent in the ink composition often hinders the formation of contour portions of writing when the ink composition is used, and thus the ink composition fails to provide desirable dual color effect.

It has been already known that in common ink compositions, which are not dual color compositions, a pearlescent pigment is used as a pigment as well as a water-soluble rosin or a styrene-acrylic acid copolymer is used as a fixing agent (see patent literature 4). These fixing agents also hinder the formation of contour portions when used for the water base dual color ink composition.

The second disadvantage is as follows. In conventional dual color ink compositions, an inner portion of writing is formed by a pigment under no influence of color of a dye used, while a metal powder pigment which has strong hiding power is used so that the resulting contour portions of writing are clearly distinguished from the inner portion. When using such a dual color ink composition, the inner portion of writing has the same color as the color the metal powder pigment originally has, regardless of a dye used, but the gloss is undeniably unsatisfactory. Then, a water base dual color ink composition which contains, in addition to or instead of metal powder pigment, a pearlescent pigment as a pigment has recently been proposed (patent literature 5).

However, conventional dual color ink compositions prepared using a pearlescent pigment have a defect that they hardly exhibit clear dual color effect because the pearlescent pigment has small hiding power than a metal powder pigment, and hence the inner portion of writing formed is influenced by the color of a dye used.

Also in conventional dual color ink compositions using a pearlscent pigment, when outer contour portions of writing are to be formed by a pale color dye, of course, the inner portion of writing is so formed as to have almost the same color as that the pearlescent pigment originally possesses, while the outer contour portions are to an extent so formed as to have a pale color, even if the pearlescent pigment has small hiding power.

However, when a deep color dye such as black, blue, brown or deep green dye is used in conventional dual color ink compositions containing a pearlescent pigment to form deep color contour portions of writing, the deep color contour portions are in fact clearly formed by such a dye, but the resulting pearlescent inner portion of writing is hardly distinguished visually clearly from the deep color contour portions under the influence of the deep color dye, thereby the ink composition hardly provides clear dual color effect. In other words, the deep color dye exerts an adverse effect to the color development of the pearlescent pigment to form the inner portion, thereby the inner portion cannot be clearly formed by the pearlescent pigment.

Patent literature 1: Japanese Unexamined Patent Publication No. 60-231777
Patent literature 2: Japanese Unexamined Patent Publication No. 61-123684
Patent literature 3: Japanese Unexamined Patent Publication No. 2000-129188
Patent literature 4: Japanese Unexamined Patent Publication No. 10-245517
Patent literature 5: Japanese Unexamined Patent Publication No. 2007-31558

DISCLOSURE OF THE INVENTION

Technical Problems to be Solved

The invention has been completed to solve the above-mentioned problems involved in the conventional water base dual color ink compositions. First, it is an object of the invention to provide a water base dual color ink composition which forms clear outer contour portions around an inner portion of writing and has an excellent fixability even if it has a relatively high viscosity.

Second, it is an object of the invention to provide a water base dual color ink composition containing a pearlescent pigment, which, even in cases a deep color dye is used to form a deep color outer contour portions around the inner portion of writing, not only forms a strongly pearlescent inner portion of writing by the pearlescent pigment in such a manner that the pearlescent pigment is not influenced by the dye used, but it develops color well, but also forms outer contour portions which is clearly distinguished from the inner portion of writing, It is also an object of the invention to provide an ink composition for a writing utensil, in particular, a water base ballpoint pen ink composition, which contains the above-mentioned water base dual color ink composition. It is a further object of the invention to provide a writing utensil, in particular, a water base ballpoint pen, using the above-mentioned water base dual color ink composition.

Means to Solve the Problems

The invention provides a water base dual color ink composition comprising:
(a) at least one pigment selected from a pearlescent pigment and a metal powder pigment;
(b) water;
(c) at least one water-soluble organic solvent selected from alcohols, glycols and glycol ethers, any of which have a branched hydrophobic group;
(d) a water-soluble dye; and
(e) a modified starch as a water-soluble fixing agent.

As one of the preferred embodiments, the invention provides a water base dual color ink composition wherein the pearlescent pigment has such color properties that a color difference $\Delta E^*$ between on a white ground and on a black ground is within the range of 30 to 80, and an $L^*$ on a white ground is 80 or more.

The invention further provides an ink composition for a writing utensil, in particular, a water base ballpoint pen ink composition which comprises the above-mentioned water base dual color ink composition; and furthermore, a writing utensil, in particular, a water base ballpoint pen which comprises the above-mentioned water base dual color ink composition.

Effect of the Invention

The water base dual color ink composition according to the invention has an excellent fixability of writing on a substrate, even if the composition has a relatively high viscosity, like a case in which the composition includes a thickener, because the ink composition contains a modified starch as a fixing agent. In addition, the water base dual color ink composition forms a writing having clear outer contour portions around an inner portion of writing on account of excellent penetration and diffusion of a dye into the substrate. Further, the water base dual color ink composition as one of preferred embodiments of the invention can give a writing with a colored and strongly pearlescent inner portion and outer contour portions clearly distinguished from such an inner portion, even if a deep color dye is used.

Best Mode for Carrying Out the Invention

The water base dual color ink composition according to the present invention comprises:
(a) at least one pigment selected from a pearlescent pigment and a metal powder pigment;
(b) water;
(c) at least one water-soluble organic solvent selected from alcohols, glycols and glycol ethers, any of which have a branched hydrophobic group;
(d) a water-soluble dye; and
(e) a modified starch as a water-soluble fixing agent.

The water base dual color ink composition of the invention uses at least one pigment selected from a pearlescent pigment and a metal powder pigment as a pigment. The pigment is fixed on a substrate by a fixing agent to form an inner portion of writing.

The pearlescent pigment used in the water base dual color ink composition of the invention is not particularly limited; any pearlescent pigments may be used insofar as they have good gloss. For example, natural or synthetic mica whose surface is coated with a metal oxide such as titanium oxide or iron oxide is preferably used as the pearlescent pigment, although argentine, basic carbonates or bismuth oxycholoride may also be used.

Further, it is preferable that the pearlescent pigment used in the water base dual color ink composition of the invention has an average particle size ranging from 5 to 60 μm. When the average particle size of the pearlescent pigment is smaller than 5 μm, the pearl gloss is weak. The upper limit of the average particle size of the pearlescent pigment depends on the use of the dual color ink composition of the invention, and when the composition is used for, for example, a ballpoint pen ink composition, it is usually 60 μm. When the average particle size of the pearlescent pigment is more than 60 μm, the discharge of the ink composition when writing comes to be worse.

According to the invention, various commercial products of pearlescent pigments may be used. Examples of such commercial pearlescent pigments include Iriodin (manufactured by Merck Ltd., Japan) such as Iriodin 100 (particle size: 10 to 60 μm, silver), 103 (particle size: 10 to 60 μm, silver), 201 (particle size: 5 to 25 μm, pearl), 221 (particle size: 5 to 25 μm, pearl), 231 (particle size: 5 to 25 μm, pearl), 300 (particle size: 10 to 60 μm, gold), 302 (particle size: 5 to 25 μm, gold), 323 (particle size: 5 to 25 μm, gold), 504 (particle size: 10 to 60 μm, red), 524 (particle size: 5 to 25 μm, red), 502 (particle size: 10 to 60 μm, bronze), and 520 (particle size: 5 to 25 μm, bronze); ULTIMICA (manufactured by Nihon Koken Kogyo Co., Ltd.) such as ULTIMICA SB-100 (particle size: 5 to 30 μm, silver), SD-100 (particle size: 10 to 60 μm, silver), RYB-100 (particle size: 5 to 30 μm, gold), and RYD-100 (particle size: 10 to 60 μm, gold); TAYCA PEARL (manufactured by Tayca Corporation) such as TAYCA PEARL TP-500 (particle size: 10 to 70 μm, silver), and TPX-720 (particle size: 7 to 45 μm, silver). These pearlescent pigments may be used alone or as a mixture of two or more kinds.

The metal powder pigment used in the water base dual color ink composition of the invention is not particularly limited; any metal powder pigments may be used insofar as they have metallic luster. The metal powder pigment used includes, for example, aluminum powder pigments and brass powder pigments. Examples of the aluminum powder pigment include Alpaste (manufactured by Toyo Aluminium K.K.) such as Alpaste WJP-U75C, WE1200, WXM7675 and WXM0630; 1110W and 2172SW (manufactured by Showa Aluminum Corporation); AW-808C and AW7000R (manufactured by Asahi Kasei Corporation), and the like. Examples of the brass powder pigment include BS-605 and BS-607 (manufactured by Toyo Aluminum K.K.), bronze powder P-555, and P-777 (manufactured by Nakajima Metal Leaf & Powder Co., Ltd), and the like.

In addition to the pigments listed above, colored aluminum powder pigments such as F 500 RG-W, F 500 BG-W, F 701 GR-W, and F 701 RE-W (manufactured by Showa Aluminum Corporation) may be used. These metal powder pigments may be used alone or as a mixture of two or more kinds. The particle size of the metal powder pigment used can be appropriately selected depending on the design of writing.

According to the invention, the pearlescent pigment and the metal powder pigment may be used alone or as a mixture thereof. In either case, the pigment content in the ink composition is appropriately decided depending on the kind of the pigment used, and the like. The content is preferably in the range from 4 to 20% by weight as solid base, more preferably in the range from 5 to 15% by weight as solid base. When the pigment content in the ink composition is more than 20% by weight as solid base, then the solid concentration in the ink composition is so high that the viscosity or flowability of the ink composition may be adversely affected. When the concentration is less than 4% by weight as solid base, the hiding power of the pigment in the writing formed is so weak that the desirable dual color effect cannot be obtained.

When the pearlescent pigment and the metal powder pigment are used in combination, the weight ratio thereof is appropriately decided depending on the design required for writing and the kind of the pigment used. The amount of the metal powder pigment is preferably within the range of 1 to 50 parts by weight, more preferably 2 to 30 parts by weight, per 100 parts by weight of the pearlescent pigment. When the metal powder pigment is used in an amount of more than 50 parts by weight per 100 parts by weight of the pearlescent pigment, the resulting ink composition fails to provide a writing with high luster which the pearlescent pigment originally possesses. When the amount is less than one part by weight, the hiding power caused by the metal powder pigment in an inner portion of writing comes to be poor, and the inner portion is easily affected by the color of the outer contour portions of writing. This cause a defect that even if the same pearlescent pigment is used, the inner portion looks quite different in color depending on the color of the outer contour portions.

However, according to the invention, when a pearlescent pigment having a color difference $\Delta E^*$ between on a white ground and on a black ground in the range of 30 to 80, and an $L^*$ on a white ground of 80 or more is used, there is obtained a dual color ink composition capable of providing a bordered writing composed of a colored and strongly pearlescent inner portion and outer contour portions therearound which can be clearly distinguished from the inner portion even if a deep color dye is used. The pearlescent pigments having the color properties as stated above have a characteristic that color development is very small on a white ground.

As one of the color systems defined by CIE (International Commission on Illumination), $L^*a^*b^*$ color system is known. According to the color system, $L^*$ denotes lightness of a color. Larger the value of $L^*$, it shows more white, and smaller the value, it shows more black. $L^*$ of perfect white is 100. The symbols $a^*$ and $b^*$ denote chromaticity, which indicates hue and saturation, respectively. That is, according to the $L^*a^*b^*$ system, one color is expressed by a coordinate ($L^*$, $a^*$, $b^*$) wherein the color difference $\Delta E$ between the first color ($L_1^*$, $a_1^*$, $b_1^*$) and the second color ($L_2^*$, $a_2^*$, $b_2^*$) is shown by a distance between the two colors, the following equation (1):

$$\Delta E=((L_1^*-L_2^*)^2+(a_1^*-a_2^*)^2+(b_1^*-b_2^*)^2)^{1/2} \quad (1)$$

In the conventional water base dual color ink compositions, the color of a dye in the area of inner portion of writing is hindered by a pigment used. However, according to the invention, even if a deep color dye is used, the use of a pearlescent pigment having the color properties mentioned above in combination with such a deep color dye provides a water base dual color ink composition which not only forms a writing composed of an inner portion formed by the pearlescent pigment and provided with high chromaticity making use of color of the dye in the area of inner portion, but also forms outer contour portions around the inner portion of writing which is deeply colored by the dye and which is distinguished from the inner portion visually clearly.

Examples of the pearlescent pigment having the color properties as described above include the above-mentioned 201, 221, 231, and the like.

In the dual color ink composition of the invention, the water-soluble organic solvent has a function to make a dye contained in the ink composition penetrate and diffuse into a substrate to form outer contour portions around an inner portion of writing. According to the invention, as such a water-soluble organic solvent, at least one selected from alcohols, glycols, and glycol ethers, any of which have a branched hydrophobic group, is used. The structure having the "branched hydrophobic group" herein means a structure wherein a hydrophobic group(s) is/are attached to a main chain as a side chain(s) in a chain structure compound. The hydrophobic group is an alkyl group having 1 to 4 carbon atoms, and preferably methyl group, ethyl group, or the like. The water-soluble organic solvent may have one or more hydrophobic groups in the molecule, and when the solvent has two or more hydrophobic groups, they may be the same or different from each other.

As an alcohol having the branched hydrophobic group among the water-soluble organic solvents as stated above, aliphatic saturated alcohols having 4 to 6 carbon atoms are preferably used. Examples thereof include isobutanol, s-butanol, t-butanol), isopentanol, s-pentanol, t-pentanol, 3-pentanol, 3-methyl-2-butanol, 2-methyl-1-butanol, 2-ethylbutanol, 4-methyl-2-pentanol, and the like.

The glycols or glycol ethers having the branched hydrophobic group include, for example, 1,3-octylene glycol (2-ethyl-1,3-hexanediol), hexylene glycol (2-methyl-2,4-pentanediol), dipropylene glycol, tripropylene glycol, polypropylene glycol, poly(oxyethylene-oxypropylene) derivatives, ethyleneglycol monoisopropyl ether, propyleneglycol monobutyl ether, propyleneglycol monoethyl ether, dipropyleneglycol monobutyl ether, dipropyleneglycol monopropyl ether, dipropyleneglycol monoethyl ether, dipropyleneglycol monomethyl ether, and the like.

According to the invention, among the organic solvents as stated above, dipropyleneglycol monopropyl ether, dipropyleneglycol monomethyl ether, and hexylene glycol are particularly preferably used. The dual color ink composition of the invention contains the water-soluble organic solvent in a content ranging usually from 1 to 50% by weight, preferably from 5 to 30% by weight based on the ink composition. When the content of the water-soluble organic solvent in the ink composition is more than 50% by weight, the solubility of water-soluble resin may possibly lower and the resin may be precipitated in the ink composition. When the content of the water-soluble organic solvent is less than 1% by weight, a dye in the ink composition does not penetrate or diffuse into the substrate when writing, and thus the resulting ink composition hardly provides a writing with a clear border. Also, the larger the amount of the water-soluble organic solvent relative to the water in the ink composition, the wider the width of outer contour portions around an inner portion of writing, but at the same time, the stability of the ink composition comes to be poor. Therefore, it is preferable that the weight ratio of water/water-soluble organic solvent is within a range of 1.5 to 4 according to the invention.

The water-soluble dye is a coloring agent which mainly forms outer contour portions of writing around an inner portion, and at least one dye selected from anthraquinone dyes, diphenyl methane dyes, triphenyl methane dyes, xanthene dyes, acridine dyes, 1:1 metal complex dyes, 1:2 metal complex dyes and copper phthalocyanine dyes is usually used. Among them, at least one dye selected from diphenyl methane dyes, triphenyl methane dyes, xanthene dyes, acridine dyes, and metal complex dyes is preferably used in the invention.

Any anthraquinone dye may be used so long as it has an anthraquinone backbone, and the dyes include anthraquinone derivatives, anthrone derivatives, and the like. Examples of the anthraquinone dye may include C.I. Acid Blue 27, C.I. Acid Blue 43, C.I. Acid Green 25, C.I. Basic Violet 25, C.I. Basic Blue 60, C.I. Mordant Red 11, C.I. Acid Red 83, C.I. Direct Green 28, C.I. Mordant Blue 48, and the like.

Examples of the diphenyl methane dye may include C.I. Basic Yellow 2, C.I. Basic Yellow 3, C.I. Basic Yellow 37, and the like. Concrete examples of the triphenyl methane dye may include C.I. Acid Blue 90, C.I. Acid Blue 104, C.I. Acid Grern 16, C.I. Acid Violet 49, C.I. Acid Red 9, C.I. Basic Blue 7, C.I. Acid Violet 1, C.I. Acid Red 289, C.I. Direct Blue 41, C.I. Mordant Blue 1, C.I. Mordant Violet 1, and the like.

Examples of the xanthene dye may include C.I. Acid Yellow 73, C.I. Acid Yellow 74, C.I. Acid Red 52, C.I. Acid Violet 30, C.I. Basic Red 1, C.I. Basic Violet 10, C.I. Mordant Red 27, C.I. Mordant Violet 25, and the like. Examples of the acridine dye may include C.I. Basic Yellow 6, C.I. Basic Yellow 7, C.I. Basic Orange 14, C.I. Basic Orange 15, and the like.

The metal complex dye shall include dyes having a metal and dyes capable of forming a coordinate bond with a metal, in addition to commonly known metal complex dyes. Examples of the dye capable of forming a coordinate bond with a metal may include azo dyes having hydroxyl group, carboxyl group, amino group, or the like. Examples of such an azo dye may include C.I. Mordant Red 30, C.I. Mordant Yellow 3, C.I. Mordant Green 15, C.I. Mordant Blue 13, and the like.

According to the invention, of these metal complex dyes, the copper phthalocyanine dyes, 1:1 metal complex dyes and 1:2 metal complex dyes are particularly preferably used. Examples of the copper phthalocyanine dye may include C.I. Direct Blue 86, and the like; examples of the 1:1 metal complex dye may include C.I. Acid Yellow 54, C.I. Acid Orange 74, C.I. Acid Red 186, C.I. Acid Violet 56, and the like; examples of the 1:2 metal complex dye may include C.I. Acid Yellow 59, C.I. Acid Black 60, C.I. Acid Red 296, C.I. Acid Blue 167, and the like.

The content of the water-soluble dye in the ink composition is appropriately decided depending on the kind of the water-soluble dye used among others, and it is within a range of, usually 0.05 to 5% by weight, preferably from 0.1 to 3% by weight based on the ink composition. When the content of the water-soluble dye in the ink composition is more than 5% by weight, the viscosity and the flowability of the resulting ink composition may be adversely affected. On the contrary, when the content of the water-soluble dye in the ink composition is less than 0.05% by weight, the resulting ink composition hardly provides a writing with desirable outer contour portions around an inner portion of writing.

In the water base dual color ink composition according to the invention, a modified starch is used as a water-soluble fixing agent. The modified starch refers to a derivative in which a functional group is introduced into a starting starch such as potato starch, corn starch, tapioca starch or wheat starch, a degradation product of the starting starch, and the starting starch subjected by a physical treatment such as heating.

Examples of the starch derivative in which a functional group is introduced into an anhydroglucose residue in the starch include etherified starch exemplified by hydroxypropyl starch (Penone JE-66, Piostarch K5 and the like), carboxymethylstarch (Kiprogum F-500, Kiprogum M-800A and the like), and cationic starch (Excell DH, Petrosize J, and the like); esterified starch exemplified by starch acetate (ZP-2, Z-100, and the like), starch octenyl succinate (Natural Nisk, Octie, and the like), and starch phosphate (Bribine); cross-linked starch exemplified by distarch phosphate (Celex, GFM, and the like), glycerol distarch (Rongum CE-3, Rheotack ML, and the like); grafted starch (Petrosize-2B, Petrocoat C-8, and the lime), and the like.

Examples of the degradation product of starch include pyrodextrin exemplified by white dextrin (Red Ball dextrin MF-30, No. 4-C, and the like), yellow dextrin (Red Ball dextrin No. 102 S, ND-S, and the like), British gum (Red Ball British Gum No. 69, and APA, and the like); enzyme-modified dextrin which is generally referred to as "maltodextrin" (Amycol SQ, Penone PKW, and the like); acid-degraded starches, oxidized starches, and the like. The modified starches as listed above all can be available from Nippon Starch Chemical Co., Ltd. Other examples of the starch derivative may include non-modified pregelatinized starches and modified pregelatinized starches. These starch derivatives may be used alone or as a mixture of two or more kinds.

In the invention, of these modified starches, starches whose viscosity is lower in its aqueous solution are preferable, and etherified starches and enzyme-modified dextrin are particularly preferably used. Examples of commercial products of such modified starch include the above-mentioned Penone JE-66, Penone PKW, Amycol SQ (all of them are manufactured by Nippon Starch Chemical Co., Ltd.).

In particular, according to the invention, of the above-mentioned modified starches, starches having an amylopectin backbone content of 90% or more are preferably used. These modified starches are resistant to aging because of low amylose content, and, in particular, they provide the resulting ink composition with excellent storage stability at low temperatures. Further, of these modified starches, etherified starches having a degree of etherification range of 3 to 10% are preferably used. The degree of etherification in the etherified starch refers to a ratio of a total molecular weight of functional groups substituting for hydroxyl groups of glucose residues to the molecular weight of one molecular chain of the starch. The above-mentioned etherified starches exhibit high stability in solubility in a mixed system of water and a large amount of a water-soluble organic solvent. Of these starches, hydroxypropylated starches are preferably used. Hydroxypropylated starches having a degree of hydroxypropylation of more than 10% give an ink composition having excellent stability at low temperatures, but such an ink compositions has poor stability at high temperatures of more than 50° C. Hydroxypropylated starches having a degree of hydroxypropylation of less than 3% hardly provide the above-mentioned effects.

The content of the water-soluble fixing agent in the water base dual color ink composition of the invention is appropriately decided depending on its kind and the content of the pigment used, and it is usually from 0.5 to 15% by weight, preferably from 1 to 10% by weight based on the ink composition. When the content of the water-soluble fixing agent in the ink composition is more than 15% by weight, the viscosity of the resulting ink composition is too high, thus sometimes resulting in difficulty of writing. When the content of the water-soluble fixing agent in the ink composition is less than 0.5% by weight, the effect of fixing the pigment sometimes cannot be obtained.

Although the modified starch has excellent solubility in water, it dose not have so excellent solubility in a water-soluble organic solvent or it is hardly soluble in a water-soluble organic solvent. When a writing is formed on a substrate with the ink composition including such a modified starch as a fixing agent, the modified starch hardly influences the effects caused by the water-soluble organic solvent, which penetrates and diffuses into the substrate together with a dye contained therein thereby forming outer contour portions around an inner portion of writing, but it has excellent effects as a fixing agent thereby remaining mainly on the substrate with a pigment to form an inner portion of writing. On the other hand, as stated above, because the modified starch hardly influences the penetrating and diffusing action of the water-soluble organic solvent containing the dye in the substrate, the water-soluble organic solvent forms clear contour portions around an inner portion of writing together with the dye.

On the contrary, if a water-soluble fixing agent having excellent solubility in a water-soluble organic solvent is used, the viscosity of water-soluble organic solvent is increased by a large amount of the water-soluble fixing agent dissolved therein, thereby preventing the dye from penetrating and diffusing into the substrate, thereby the formation of contour portions is inhibited.

In order to appropriately control the viscosity of the water base dual color ink composition of the invention depending on its use, a water-soluble thickener may be contained in the composition. For example, when the water base dual color ink composition of the invention is used as a water base ballpoint pen ink composition, it is preferable to control the viscosity thereof to a range described below by using a thickener. According to the invention, gummy polysaccharide is preferably used as such a water-soluble thickener. The gummy polysaccharide preferably used is at least one selected from rhamsan gum, xanthan gum, wellan gum, gellan gum, pullulan, xanthan gum, guar gum, locust bean gum, and pectin. The gummy polysaccharide shall include not only natural ones but also processed products and derivatives thereof. In addition to the gummy polysaccharide as listed above, colloidal polysaccharide such as pectin; proteins such as casein and gelatin; and synthesized water-soluble resins such as sodium polyacrylate may also be used as the water-soluble thickener.

The content of the thickener in the ink composition is decided depending on the use of the ink composition and the property required, and when, for example, a water base ballpoint pen ink composition is to be prepared, the content of the thickener ranges usually from 0.05 to 0.5% by weight, preferably from 0.1 to 0.3% by weight based on the ink composition. When the content of the thickener is too much, the viscosity of the resulting ink composition becomes too high, whereby the flow of the ink composition from a pen tip becomes worse when writing, thus resulting in poor writing property. When the content of the thickener is too low, however, the viscosity of the resulting ink composition becomes too low, whereby the dispersion stability of the pigment in the ink composition becomes poor, and thus it is easily stopped at the pen tip.

The water base dual color ink composition of the invention may include urea or its derivatives so that it has storage stability at low temperatures for a long period of time. The urea derivatives may include methylurea, dimethylurea, tetramethylurea, ethylurea, tetraethylurea, hydroxyethylurea, dihydroxyethylurea, ethyleneurea, dimethylolurea, sulfonylurea, thiourea, monomethylthiourea, dimethylthiourea, ethyleneoxide adducts of urea, and the like, among which are particularly preferred urea and dimethyl urea.

According to the invention, the content of urea or urea derivative is appropriately decided depending on the kind of the water-soluble fixing agent and the amount of the water-soluble organic solvent used, among others, and the content ranges usually from 2 to 20% by weight, preferably from 5 to 15% by weight based on the ink composition. When the content of urea or urea derivative in the ink composition is more than 20% by weight, the viscosity of the ink composition may possibly be too high, because the water content in the resulting ink composition is relatively reduced, and further, a writing may be remarkably difficult to be dried, when using it as a ballpoint pen ink composition. On the other hand, when the content of urea or urea derivative in the ink composition is less than 2% by weight, the resulting ink composition has a poor or no long-term storage stability at low temperatures, and sometimes some of the ink components, in particular, the fixing agent or modified starch may separate.

When the water base dual color ink composition of the invention is used as, for example, a ballpoint pen ink composition, it may contain a wetting agent comprising a polyhydric alcohol or its derivative, as occasion demand, so that a pen tip is not dried even if the ballpoint pen is left standing with no cap covering the pen tip, or so that the ink composition flows smoothly from the pen tip and a writing is not blurred when writing is started. Examples of the polyhydric alcohol or its derivative may include ethylene glycol, diethylene glycol, propylene glycol, glycerin, polyethylene glycol, and the like. Of these, ethylene glycol and glycerin are preferably used. The wetting agent is used in a content ranging usually 10% by weight or less, preferably from 3 to 8% by weight, based on the ink composition.

The water base dual color ink composition of the invention may contain other additives within the range in which the effects the composition originally has are not interfered. Examples of the additive may include lubricants such as polyoxyethylene alkali metal salts, dicarboxylic amides, phosphate esters, and N-oleyl sarcosine salts; corrosion inhibitors such as benzotriazole, tolyl triazole, and dicyclohexyl ammonium nitrate; and preservatives and antifungal agents such as benzoisothiazoline, pentachlorophenol or cresol. In addition, the composition may contain various dispersing agents, surfactants, thickeners, and the like.

When the water base dual color ink composition of the invention is used for a water base ballpoint pen, it is preferable that the viscosity of the ink composition is within the range of 2000 to 10000 mPa·s as measured by using an ELD viscometer with a 3° (R14) corn at a rotation speed of 0.5 rpm at a temperature of 20° C. When the ink composition has a viscosity within the above-mentioned range, it has excellent long-term stability and good writing property required as a water base ballpoint pen ink composition. A water base dual color ink composition having such a viscosity as the above-mentioned range may be obtained by using an appropriate amount of the above-mentioned water-soluble thickener, or by controlling the amount of water in the ink composition.

The method for production of the water base dual color ink composition of the invention is not specifically limited. It can be produced by a method comprising of steps of dispersion, defoaming, and filtration, and the like, which have hitherto been employed in the production of ink compositions. By way of examples, water, a water-soluble dye and a pigment are mixed and stirred, and a fixing agent and, if necessary, a thickener are added to the resulting mixture, followed by addition thereto of a water-soluble organic solvent and, if necessary, various additives, and then the mixture is uniformly blended to give an ink composition. In each step, the mixing or stirring may be carried out using a common stirring device which has hitherto been known, such as a dissolver, mixer, or kneader.

The water base dual color ink composition of the invention may be used as an ink composition for various writing utensils such as markers and felt pens, and in particular, as stated above, it may preferably be used as a ballpoint pen ink composition. The writing utensils according to the invention are the same as the conventionally known markers, felt pens and water base ballpoint pens except that the ink composition used therein is the water base dual color ink composition of the invention as set forth hereinabove.

Therefore, for example, an ink-holding tube of such a water base ballpoint pen may be the same as the conventional one produced using a known material. That is, the ink-holding tube may be made of a synthetic resin pipe such as a polyethylene or polypropylene pipe, or a metal pipe.

A ballpoint pen tip may also have the same structure and may be made of the same material as those for the known water base ballpoint pens. According to the invention, however, it is preferable to use a ballpoint pen tip having a difference between a ball diameter and an inside diameter of a boll house of 0.03 mm or more, preferably from 0.03 to 0.07 mm. The above-mentioned difference corresponds to the nearest distance between the ball and the inside surface of the ball house. The difference between a ball diameter and a inside diameter of a ball house in a ballpoint pen tip of conventional ballpoint pens is usually from about 0.01 to 0.02 mm. In contrast, the ballpoint pen of the invention has such a large difference of 0.03 mm or more as mentioned above so that it certainly exhibits desirable dual color effects due to the water base dual color ink composition of the invention. When a ballpoint pen is assembled using various parts including the above-mentioned ink-holding tube and ballpoint pen tip, conventionally known, usual methods may be employed.

Water-soluble organic solvent: dipropyleneglycol monomethyl ether

Water-soluble dye 1: Acid Red 289

Water-soluble dye 2: Acid Green 16

Thickener: rhamsan gum (K7C 233 manufactured by Sansho Co., Ltd.)

Fixing agent 1: enzyme-modified dextrin (Penone PKW manufactured by Nippon Starch Chemical Co., Ltd.)

Fixing agent 2: hydroxypropyl starch (Penone JE-66 manufactured by Nippon Starch Chemical Co., Ltd.)

Fixing agent 3: polyvinyl alcohol (PVA-204 manufactured by Kuraray Co., Ltd.)

Fixing agent 4: polyvinyl pyrrolidone (Pitzcol K-15 manufactured by Dai-Ichi Kogyo Seiyaku Co., Ltd.)

Preservative: Proxel XL-2 manufactured by Arch Chemicals, Inc.

Antifungal agent: Coatside H manufactured by Takeda Chemical industries, Ltd.

TABLE 1

|  | EXAMPLES | | | | | | COMPARATIVE EXAMPLES | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Ink Composition (% by weight) | | | | | | | | | | | | |
| Pigment 1 | 10.0 | 10.0 | 10.0 | 10.0 |  |  | 10.0 | 10.0 | 10.0 | 10.0 |  |  |
| Pigment 2 |  |  | 2.0 | 2.0 | 5.0 | 5.0 |  |  | 2.0 | 2.0 | 5.0 | 5.0 |
| Water-soluble organic solvent | 20.0 | 20.0 | 20.0 | 20.0 | 20.0 | 20.0 | 20.0 | 20.0 | 20.0 | 20.0 | 20.0 | 20.0 |
| Ion-exchanged water | 64.0 | 64.0 | 61.0 | 59.0 | 70.9 | 70.9 | 68.0 | 64.0 | 61.0 | 59.0 | 70.9 | 70.9 |
| Water-soluble dye 1 | 1.0 |  |  |  | 1.0 | 1.0 | 1.0 | 1.0 |  |  | 1.0 | 1.0 |
| Water-soluble dye 2 |  | 1.0 | 2.0 | 2.0 |  |  |  |  | 2.0 | 2.0 |  |  |
| Thickener | 0.2 | 0.2 | 0.2 | 0.2 | 0.3 | 0.3 | 0.2 | 0.2 | 0.2 | 0.2 | 0.3 | 0.3 |
| Fixing agent 1 | 4.0 | 4.0 |  |  | 2.0 |  |  |  |  |  |  |  |
| Fixing agent 2 |  |  | 4.0 | 6.0 |  | 2.0 |  |  |  |  |  |  |
| Fixing agent 3 |  |  |  |  |  |  |  |  | 4.0 |  | 2.0 |  |
| Fixing agent 4 |  |  |  |  |  |  |  |  | 4.0 | 6.0 |  | 2.0 |
| Preservative | 0.4 | 0.4 | 0.4 | 0.4 | 0.4 | 0.4 | 0.4 | 0.4 | 0.4 | 0.4 | 0.4 | 0.4 |
| Antifungal agent | 0.4 | 0.4 | 0.4 | 0.4 | 0.4 | 0.4 | 0.4 | 0.4 | 0.4 | 0.4 | 0.4 | 0.4 |
| Properties of Ink Composition | | | | | | | | | | | | |
| Dual color property | A | A | A | A | A | A | A | C | C | C | B | B |
| Fixability | A | A | A | A | A | A | C | A | B | A | C | B |

EXAMPLES

The invention will be described in detail with reference to Examples and Comparative Examples. The invention, however, is not limited thereto.

Examples 1 to 6 and Comparative Examples 1 to 6

The components (% by weight) shown in each of Examples of Table 1 were mixed and stirred at ordinary temperature for 2 hours using a dispersing device to prepare a water base dual color ink composition. Each component shown in Table 1 is as follows:

Pigment1: Iriodin 323 (mica covered with a metal oxide manufactured by Merck Ltd., Japan)

Pigment2: aluminum powder pigment (Alpaste WXM 0630 manufactured by Toyo Aluminum K.K.)

A polypropylene ink-holding tube provided with a stainless steal ballpoint tip containing a ceramic ball at one end was filled with each of the ink compositions of Examples 1 to 6 and Comparative Examples 1 to 6 shown in Table 1, and then an agent for preventing reverse flow of the ink, which was composed of gelled silicone oil, was filled therein to produce a ballpoint pen refill. The ballpoint pen refill was then attached to a ballpoint pen body, a cap was fit, air in the tube was removed using a centrifugal machine, and finally an end plug was attached to the other end of the ink-holding tube to provide a ballpoint pen.

A straight line was written as a writing with the ballpoint pen produced in each of Examples and Comparative Examples on a Kent paper at a rate of 7 cm/second, and the dual color property and fixability of the writing were evaluated according to the following criteria. The results are shown in Table 1.

The dual color property was visually evaluated according to the following criteria. That is, a case where the contour portions can be clearly recognized around the inner portion is defined as A; a case where the contour portions can be recognized but they are unclear is defined as B, and a case where the contour portions are hardly recognized is defined as C.

The fixability was evaluated by a degree of peeling of the writing when it was scratched with fingers after it was thoroughly dried. That is, a case where there is almost no peeling is defined as A; a case where the writing is peeled but is still remaining is defined as B; and a case where the writing is completely peeled is defined as C.

As apparent from the results shown in Table 1, the dual color property and the fixability of the ink compositions according to Comparative Examples 1 to 6 were found to be incompatible with each other. The better the fixability, the poorer the dual color property, and the better the dual color property, the poorer the fixability. On the contrary, the dual color property and the fixability of the ink compositions according to Examples 1 to 6 were found to be compatible with each other.

Examples 7 to 10 and Reference Examples 1 to 5

The components (% by weight) shown in each Example of Table 2 were mixed and stirred at ordinary temperature for 2 hours using a dispersing device to prepare a water base dual color ink composition. Each component shown in Table 2 is shown below, provided that components which are not described are the same as those described in Table 1.
Water-soluble dye: Acid Red 289
Water-soluble organic solvent 1: dipropyleneglycol monomethyl ether
Water-soluble organic solvent 2: ethylene glycol
Fixing agent 1: enzyme-modified dextrin (Penone PKW manufactured by Nippon Starch Chemical Co., Ltd.)
Fixing agent 2: hydroxypropyl starch (Penone JE-66 manufactured by Nippon Starch Chemical Co., Ltd.)

The storage stability at low temperatures was evaluated as follows. After the ballpoint pen was stored at a temperature of 5° C. for one month in a refrigerator, the appearance of the ink composition was observed and evaluated according to the following criteria. That is, a case where no change of the ink composition is observed is defined as A: a case where a little separation of the ink composition is observed is defined as B; and a case where complete separation of the ink composition is observed is defined as C.

All of the ink composition according to Reference Examples 1 to 5 had the excellent dual color property and fixability, but the separation of the components was observed when being stored at low temperatures. It was also shown that even if a small amount of dimethylurea was added, the effect was unsatisfactory. On the contrary, the ink composition according to Examples 7 to 10 had the excellent dual color property, fixability and storage stability at low temperatures.

Examples 11 to 14 and Reference Examples 6 to 11

The components (% by weight) shown in each Example of Table 3 were mixed and stirred at ordinary temperature for 2 hours using a dispersing device to prepare a water base dual color ink composition. Each component shown in Table 3 is shown below, provided that components which are not described are the same as those described in Table 1. The following hydroxypropyl starches were used as a water-soluble fixing agent.
Water-soluble dye: Acid Red 289
Fixing agent 1: amylopectin backbone content: 98%, degree of hydroxypropylation: 4.5%

TABLE 2

| | EXAMPLES | | | | REFERENCE EXAMPLES | | | | |
|---|---|---|---|---|---|---|---|---|---|
| | 7 | 8 | 9 | 10 | 1 | 2 | 3 | 4 | 5 |
| Ink Composition (% by weight) | | | | | | | | | |
| Pigment 1 | 10.0 | 10.0 | 10.0 | | 10.0 | 10.0 | 10.0 | | |
| Pigment 2 | | 2.0 | 2.0 | 5.0 | | 2.0 | 2.0 | 5.0 | 5.0 |
| Water-soluble organic solvent 1 | 20.0 | 20.0 | 20.0 | 20.0 | 20.0 | 20.0 | 20.0 | 20.0 | 20.0 |
| Water-soluble organic solvent 2 | | 5.0 | 5.0 | | | 5.0 | 5.0 | | |
| Ion-exchanged water | 54.0 | 52.0 | 45.0 | 60.0 | 64.0 | 57.0 | 55.0 | 67.0 | 66.0 |
| Water-soluble dye | 1.0 | 1.0 | 1.0 | 1.0 | 1.0 | 1.0 | 1.0 | 1.0 | 1.0 |
| Thickener | 0.2 | 0.2 | 0.2 | 0.2 | 0.2 | 0.2 | 0.2 | 0.2 | 0.2 |
| Fixing agent 1 | 4.0 | | 6.0 | | 4.0 | | 6.0 | | |
| Fixing agent 2 | | 4.0 | | 6.0 | | 4.0 | | 6.0 | 6.0 |
| Urea | 10.0 | 5.0 | | | | | | | |
| Dimethylurea | | | 10.0 | 7.0 | | | | | 1.0 |
| Preservative | 0.4 | 0.4 | 0.4 | 0.4 | 0.4 | 0.4 | 0.4 | 0.4 | 0.4 |
| Antifungal agent | 0.4 | 0.4 | 0.4 | 0.4 | 0.4 | 0.4 | 0.4 | 0.4 | 0.4 |
| Properties of Ink Composition | | | | | | | | | |
| Dual color property | A | A | A | A | A | A | A | A | A |
| Fixability | A | A | A | A | A | A | A | A | A |
| Storability at low temperature | A | A | A | A | C | C | C | C | B |

Using each of the ink compositions of Examples 7 to 10 and Reference Examples 1 to 5 shown in Table 2, a ballpoint pen was prepared in the same manner as in previous Examples, and the dual color property and the fixability of the writing formed were evaluated in the same manner as in previous Examples, as well as the storage stability at low temperatures of the ink composition was evaluated. The results are shown in Table 2.

Fixing agent 2: amylopectin backbone content: 98%, degree of hydroxypropylation: 6.3%
Fixing agent 3: amylopectin backbone content: 98%, degree of hydroxypropylation: 8.6%
Fixing agent 4: amylopectin backbone content: 79%, degree of hydroxypropylation: 2.0%
Fixing agent 5: amylopectin backbone content: 79%, degree of hydroxypropylation: 6.5%

TABLE 3

|  | EXAMPLES | | | | REFERENCE EXAMPLES | | | | | |
| --- | --- | --- | --- | --- | --- | --- | --- | --- | --- | --- |
|  | 11 | 12 | 13 | 14 | 6 | 7 | 8 | 9 | 10 | 11 |
| Ink Composition (% by weight) | | | | | | | | | | |
| Pigment 1 | 10.0 | 10.0 | 10.0 | 10.0 | 10.0 | 10.0 | 10.0 | 10.0 | 10.0 | 10.0 |
| Pigment 2 | 2.0 | 2.0 | 2.0 | 2.0 | 2.0 | 2.0 | 2.0 | 2.0 | 2.0 | 2.0 |
| Water-soluble organic solvent 1 | 20.0 | 20.0 | 20.0 | 20.0 | 20.0 | 20.0 | 20.0 | 20.0 | 20.0 | 20.0 |
| Water-soluble organic solvent 2 | 5.0 | 5.0 | 5.0 | 5.0 | 5.0 | 5.0 | 5.0 | 5.0 | 5.0 | 5.0 |
| Ion-exchanged water | 43.0 | 43.0 | 49.0 | 43.0 | 49.0 | 49.0 | 49.0 | 43.0 | 49.0 | 43.0 |
| Water-soluble dye | 1.0 | 1.0 | 1.0 | 1.0 | 1.0 | 1.0 | 1.0 | 1.0 | 1.0 | 1.0 |
| Thickener | 0.2 | 0.2 | 0.2 | 0.2 | 0.2 | 0.2 | 0.2 | 0.2 | 0.2 | 0.2 |
| Fixing agent 1 | 2.0 | | | | 2.0 | | | | | |
| Fixing agent 2 | | 2.0 | | | | 2.0 | | | | |
| Fixing agent 3 | | | 2.0 | 2.0 | | | | | | |
| Fixing agent 4 | | | | | | | | 2.0 | 2.0 | |
| Fixing agent 5 | | | | | | | | | | 2.0 | 2.0 |
| Uurea | 6.0 | 6.0 | | 6.0 | | | | 6.0 | | 6.0 |
| Dimethylurea | 10.0 | 10.0 | 10.0 | 10.0 | 10.0 | 10.0 | 10.0 | 10.0 | 10.0 | 10.0 |
| Preservative | 0.4 | 0.4 | 0.4 | 0.4 | 0.4 | 0.4 | 0.4 | 0.4 | 0.4 | 0.4 |
| Antifungal agent | 0.4 | 0.4 | 0.4 | 0.4 | 0.4 | 0.4 | 0.4 | 0.4 | 0.4 | 0.4 |
| Properties of Ink Composition | | | | | | | | | | |
| Dual color property | A | A | A | A | A | A | A | A | A | A |
| Fixability | A | A | A | A | A | A | A | A | A | A |
| Storability at 5° C. | A | A | A | A | B | A | C | A | A | A |
| Storability at 0° C. | A | A | A | A | C | B | C | B | B | A |
| Storability at −10° C. | B | A | A | A | C | C | C | C | C | C |

Using each of the ink compositions of Examples 11 to 14 and Reference Examples 6 to 11 shown in Table 3, a ballpoint pen was prepared in the same manner as in above Examples, and the dual color property and the fixability of the writing were evaluated in the same manner as in the above Examples, as well as the storage stability at low temperatures of the ink composition was evaluated in more detail. The results are shown in Table 3. The storage stability at low temperatures was evaluated as follows. After the ballpoint pen was stored at a temperature of 5° C. in a refrigerator for one month, or at a temperature of 0° C. or −10° C. for one month in a freezer, the appearance of the ink composition was observed and evaluated in the same criteria as above.

All of the ink compositions according to Reference Examples 6 to 11 had the excellent dual color property and fixability, but had poor storage stability at low temperatures. In particular, when they were stored at a temperature of −10° C. in the freezer, separation was observed in all of the ink compositions. It was shown that even if a large amount of dimethylurea was added, the effect was unsatisfactory.

On the contrary, the ink compositions according to Examples 11 to 14 not only had the excellent dual color property and fixability but also showed the excellent stability in particular when it was stored at a temperature of 0° C. or −10° C. in the freezer having.

Examples 15 to 17

The components (% by weight) shown in each Example of Table 4 were mixed and stirred at ordinary temperature for 2 hours using a dispersing device to prepare a water base dual color ink composition. Each component shown in Table 4 is shown below, provided that components which are not described are the same as those described in Table 1.

A color difference $\Delta E^*$ between the color on a white ground and the color on a black ground and an $L^*$ on a white ground of the pearlescent pigment used are shown. Each pearlescent pigment was dispersed in nitrocellulose lacquer (2210 Clear manufactured by Nippon Paint Co., Ltd.) in a concentration of 10% by weight, and it was coated on a white ground and on a black ground using a 20 μm wire bar, and the color difference $\Delta E^*$ between on the white ground and on the black ground, and an $L^*$ on the white ground were measured using a color difference chromoscope manufactured by Minolta. The white ground and the black ground used were hiding power ratio test paper manufactured by Nippon Testpanel Co., Ltd. The pearlescent pigment used was white or creamy white pearl, and when it was coated on a white ground, the coating was, similarly to the above, white or slightly pale yellow.

Pearlescent pigment 1: Iriodin 201 ($\Delta E^*$=36.4, $L^*$=90.6)
Pearlescent pigment 2: Iriodin 221 ($\Delta E^*$=56.8, $L^*$=90.6)
Pearlescent pigment 3: Iriodin 231($\Delta E^*$=34.8, $L^*$=90.6)
Aqueous dye solution: black dye (BONJET BLACK 256-L (manufactured by Orient Chemical Industries, Ltd., 13% by weight aqueous solution)
Fixing agent: modified dextrin (Penone PKW manufactured by Nippon Starch Chemical Co., Ltd.)

The viscosity of each ink composition of Examples 15 to 17 as measured by using an ELD viscometer with a 3° (R14) corn at a roration speed of 0.5 rpm at 20° C. is shown in Table 4. Also, using each of the ink composition of Example 15 to 17, a ballpoint pen was prepared in the same manner as the above-mentioned Examples. A straight line was written as a writing with the ballpoint pen on a Kent paper sheet at a rate of 7 cm/second, and the color of the inner portion of the writing was observed. The inner portion of writing formed by any of the ink compositions had a clear color as shown in Table 4 as the pearlescent pigment was influenced by the dye, and could clearly be distinguished from the black contour portions.

The pearlescent pigment is composed of scaly particles in which the surface of mica is coated with a thin layer of a metal oxide such as titanium oxide or iron oxide. When a coating composition containing the pearlescent pigment is coated on a substrate to form a coating film, some of visible lights incoming into the pigment particles from the surface thereof are reflected on the surface of the metal oxide layer, some are reflected on the inside of the mica layer, and some are reflected on the substrate layer. As a result, the coating film looks pearly on account of complexly mixed reflected lights. In the Examples, because the substrates were deep colors, specific colors of the visible lights incoming from the surface to the inside of the pigment particles were absorbed by the substrate, whereby the colors of the reflected lights on the substrates were affected, and further the colors of the various reflected lights as described above were affected by the thickness of the pearlescent pigments. As a result, the inner portion of the writing exhibits color as shown in Table 4 due to the thickness of the pearlescent pigments and the colors of the substrates.

TABLE 4

|  | EXAMPLES | | |
| --- | --- | --- | --- |
|  | 15 | 16 | 17 |
| Ink Composition (% by weight) | | | |
| Pearlscent pigment 1 | 10.0 | | |
| Pearlscent pigment 2 | | 10.0 | |
| Pearlscent pigment 3 | | | 10.0 |
| Water-soluble organic solvent 1 | 20.0 | 20.0 | 20.0 |
| Water-soluble organic solvent 2 | 5.0 | 5.0 | 5.0 |
| Ion-exchanged water | 50.0 | 50.0 | 50.0 |
| Aqueous dye solution | 10.0 | 10.0 | 10.0 |
| Thikener | 0.2 | 0.2 | 0.2 |
| Fixing agent | 4.0 | 4.0 | 4.0 |
| Preservative | 0.4 | 0.4 | 0.4 |
| Antifungal agent | 0.4 | 0.4 | 0.4 |
| Properties of Ink Composition and Writing | | | |
| Viscosity (mPa · s) | 2300 | 2350 | 2500 |
| Color of inner portion | gold | pearlscent blue | pearlscent green |
| Color of contour portions | black | black | black |

The invention claimed is:

1. A dual color ink composition which comprises:
   (a) at least one pigment selected from a pearlescent pigment and a metal powder pigment;
   (b) water;
   (c) at least one water-soluble organic solvent selected from alcohols, glycols and glycol ethers, any of which have a branched hydrophobic group;
   (d) a water-soluble dye; and
   (e) at least one selected from urea, ethyleneurea, methylurea and dimethylurea in an amount in total of 15-20% by weight; and
   (f) hydroxpropyl starch as a water-soluble fixing agent, wherein the hydroxypropyl starch has an amylopectin backbone content of 90% or more, and a degree of hydroxyproplation in a range of 3 to 10%.

2. The dual color ink composition according to claim 1, wherein the pearlescent pigment is a mica covered with a metal oxide.

3. The dual color ink composition according to claim 1, wherein the metal powder pigment is an aluminum powder pigment.

4. The dual color ink composition according to claim 1, which comprises both the pearlescent pigment and the metal powder pigment.

5. The dual color ink composition according to claim 4, which comprises the metal powder pigment in an amount of 1 to 50 parts by weight per 100 parts by weight of the pearlescent pigment, and the pearlescent pigment and the metal powder pigment in total in an amount of 4 to 20% by weight based on the ink composition.

6. The water base dual color ink composition according to claim 1, wherein the pearlescent pigment has such color properties that a color difference ΔE* between on a white ground and on a black ground is within the range of 30 to 80, and an L* on a white ground is 80 or more.

7. The dual color ink composition according to claim 1, which comprises the hydroxypropyl starch in an amount of 0.5 to 15% by weight based on the weight of the ink composition.

8. The dual color ink composition according to claim 1, wherein the water-soluble organic solvent is at least one selected from dipropyleneglycol monopropyl ether, dipropyleneglycol monomethyl ether and hexylene glycol.

9. The water base dual color ink composition according to claim 1, which comprises a water-soluble thickener.

10. The water base dual color ink composition according to claim 9, wherein the water-soluble thickener is a polysaccharide gum.

11. The water base dual color ink composition according to claim 10, wherein the polysaccharide gum is at least one selected from rhamsan gum, xanthan gum, wellan gum, gellan gum, pullulan, guar gum and locust bean gum.

12. The dual color ink composition according to claim 9, which comprises a water-soluble thickener in an amount of 0.05 to 0.5% by weight based on the ink composition.

13. A water base ballpoint pen ink composition comprising the dual color ink composition according to claim 1.

14. The water base ballpoint pen ink composition according to claim 13, which has a viscosity of 2000 to 10000 mPa·s as measured by using an ELD viscometer with a 3° (R14) corn at a rotation speed of 0.5 rpm at 20° C.

15. A water base ballpoint pen comprising the composition according to claim 13.

16. The dual color ink composition according to claim 1 which comprises the pearlescent pigment in an amount of 4-20% by weight based on the ink composition.

17. A dual color ink composition which comprises:
   (a) at least one pigment selected from a pearlescent pigment and a metal powder pigment:
   (b) water:
   (c) at least one water-soluble organic solvent selected from alcohols, glycols and glycol ethers, any of which have a branched hydrophobic group:
   (d) a water-soluble dye;
   (e) at least one selected from urea, ethyleneurea, methylurea and dimethylurea in an amount in total of 5-20% by weight; and
   (f) hydroxypropyl starch as a water-soluble fixing agent, wherein the hydroxypropyl starch has an amylopectin backbone content of 90% or more, and a degree of hydroxypropylation in a range of 8.6 to 10%.

18. The dual color ink composition according to claim 17, wherein the pearlescent pigment is a mica covered with a metal oxide.

19. The dual color ink composition according to claim 17, wherein the metal powder pigment is an aluminum powder pigment.

20. The dual color ink composition according to claim 17, which comprises both a pearlescent pigment and a metal powder pigment.

21. The dual color ink composition according to claim 20, which comprises the metal powder pigment in an amount of 1 to 50 parts by weight per 100 parts by weight of the pearlescent pigment, and the pearlescent pigment and the metal powder pigment are present in total in an amount of 4 to 20% by weight based on the ink composition.

22. The water base dual color ink composition according to claim 17, wherein the pearlescent pigment has such color properties that a color difference ΔE* between on a white ground and on a black ground is within the range of 30 to 80, and an L* on a white ground is 80 or more.

23. The dual color ink composition according to claim 17, which comprises the hydroxypropyl starch in an amount of 0.5-15% by weight based on the weight of the ink composition.

24. The dual color ink composition according to claim 17, wherein the water-soluble organic solvent is at least one selected from dipropyleneglycol monopropyl ether, dipropyleneglycol monomethyl ether and hexylene glycol.

25. The water base dual color ink composition according to claim 17, which comprises a water-soluble thickener.

26. The water base dual color ink composition according to claim 25, where in the water-soluble thickener is a polysaccharide gum.

27. The water base dual color ink composition according to claim 26, wherein the polysaccharide gum is at least one selected from rhamsan gum, xanthan gum, wellan gum, gellan gum, pullulan, guar gum and locust bean gum.

28. The dual color ink composition according to claim 25, which comprises a water-soluble thickener in an amount of 0.05 to 0.5% by weight based on the ink composition.

29. A water base ballpoint pen ink composition comprising the dual color ink composition according to claim 17.

30. The water base ballpoint pen ink composition according to claim 29, which has a viscosity of 2000 to 10000 m Pa·s as measured by using an ELD viscometer with a 3° (R14) corn at a rotation speed of 0.5 rpm at 20° C.

31. A water base ballpoint pen comprising the composition according to claim 29.

32. The dual color ink composition according to claim 17 which comprises the pearlescent pigment in an amount of 4-20% by weight based on the ink composition.

* * * * *